United States Patent [19]
Moran

[11] Patent Number: 4,798,321
[45] Date of Patent: Jan. 17, 1989

[54] PANELIZING MACHINE AND METHOD FOR USE

[76] Inventor: Edward Moran, 54 Keefer Road, Thorold, Ontario, Canada

[21] Appl. No.: 70,380

[22] Filed: Jul. 6, 1987

[51] Int. Cl.$^4$ .................. B23K 5/22; B23K 31/02
[52] U.S. Cl. ............................... 228/213; 228/183; 228/49.3
[58] Field of Search ............... 228/183, 213, 4.1, 61, 228/44.5, 49.1, 47, 49.3, 49.4; 29/726, 157.3 B

[56] References Cited

U.S. PATENT DOCUMENTS

| | | | |
|---|---|---|---|
| 2,998,640 | 9/1961 | Huet | 228/183 |
| 3,357,083 | 12/1967 | Wiehn et al. | 228/183 |
| 3,421,676 | 1/1969 | Jenkins | 228/213 |
| 3,585,709 | 6/1971 | Müller et al. | 228/183 |
| 3,779,444 | 12/1973 | Kensrue | 228/4.1 |
| 3,918,628 | 11/1975 | Clavey | 228/4.1 |
| 4,319,112 | 3/1982 | Connolly | 228/49.1 |
| 4,709,133 | 11/1987 | Mainville | 228/6.1 |

FOREIGN PATENT DOCUMENTS

| | | | |
|---|---|---|---|
| 563592 | 9/1958 | Canada | 29/157.3 B |
| 0846197 | 7/1981 | U.S.S.R. | 228/49.4 |

*Primary Examiner*—Kurt Rowan
*Attorney, Agent, or Firm*—Marvin A. Naigur; Martin Smolowitz

[57] ABSTRACT

A panelizing machine assembly for clamping elongated structures such as tubes at spaced intervals and then welding the structures. The machine includes an elongated main frame having connecting cross members, and provided with at least two bed plates each having a plurality of notches on their upper side, and at least two carriage structures which are self-supporting and longitudinally movable on the main frame. Each carriage is equipped with at least one contoured clamping plate which is vertically movable by pressurized piston means and have notches on their lower sides adapted for clamping the tubes onto the bed plates prior to the welding operations. Each carriage is independently movable along the main frame on rollers engaging rails attached to the elongated frame, and carriage movement is electrically controlled by photoelectric cells and brakes for accurate positioning, and operate in co-operation with a welding robot attached to the upper part of the central movable carriage. The invention also includes a method for operation of the panelizing machine to perform programmed longitudinal welding operations on elongated structures such as tubes to produce monolithic welded tubular panels.

17 Claims, 6 Drawing Sheets

PANELIZING MACHINE AND METHOD FOR USE

BACKGROUND OF INVENTION

This invention pertains to panelizing machines, and pertains particularly to a panelizing machine and method for clamping and supporting a plurality of elongated tubes and performing welding operations on the clamped tubes to produce a monowall tube panel.

Various fixtures for supporting elongated structures such as tubes for welding are known. For example, U.S. Pat. No. 3,789,479 to Zifferer et al discloses a machine for automatically assembling tubes used for shell and tube heat exchangers, including a work table and a tube holding fixture mounted on the table. U.S. Pat. No. 4,461,946 to Kratschmer discloses an apparatus for clamping parts laser welding. U.S. Pat. No. 4,014,495 to Oda et al discloses an autofor matic welding apparatus having several degrees of freedom provided in association with a workpiece holder mounted on a carriage. Also, U.S. Pat. No. 4,296,539 discloses a heat exchange tube having dual fins provided on opposite sides of the tube.

However, such known devices are generally deficient in not providing adequate support for elongated structures during a welding operation, which can cause problems of misalignment for the welded structures such as when producing monowall tubular panels. Also, the prior art has apparently not provided a panelizing apparatus having plural traveling carriages, for which longitudinal movements are correlated with that of a universally movable welding torch unit mounted thereon to produce welded monowall tube panels.

SUMMARY OF INVENTION

The present invention provides a panelizing machine for supporting and welding together a plurality of elongated parallel structures such as tubes, by using a robot welding device and a programmed welding procedure. The machine comprises an elongated main frame including dual parallel elongated frame members connected together by at least two cross members, and having at least two spaced-apart contoured bed plates each supported by a frame cross member and adapted for rigidly supporting the elongated structures or tubes on the frame. At least two clamping carriages which are longitudinally movable on the main frame are supported on dual rails each rigidly attached to a frame member, so that each carriage can be positioned above a bed plate. Each carriage is selfsupporting and can be moved independently along the main frame on guided rollers which engage the guide rails rigidly attached to the elongated frame members. Each carriage unit includes at least one and preferably four sets of contoured clamping plates, each clamping plate being vertically movable by a pressurizable piston attached to the plate upper side and having a plurality of notches on its lower side, so as to clamp the elongated tube structures in position on one of the contoured bed plates. Each pressurized clamping piston and contoured clamping plate can exert a clamping force of 5000–10,000 pounds on a set of 4 parallel tubes, so as to support and stabilize the tubes during the welding operations. A welding device is mounted on the upper portion of one of the carriages so as to extend towards an adjacent carriage. The invention preferably utilizes three carriage units with the welding device mounted on the intermediate carriage.

In operation, the carriages are each positioned longitudinally at desired positions along the main frame so as to provide the upper clamping plate substantially in vertical alignment with the lower bed plates, by using infrared proximity sensors and electrically operated brakes on each carriage. However, the carriages can each be manually positioned over the tubes if desired. After the tubes are clamped in position between the lower contoured bed plates and upper clamping plates, an electric arc welding assembly preferably mounted on the central carriage is operated in cooperation with the other carriage(s) to weld the tubes, such as by making short stitch welds spaced apart along the length of adjacent tube fins. After the welding operation is performed at one location of the carriages along the tubes, the carriages can be each moved longitudinally to a new location along the tubes by using photoelectric sensors to activate the carriage tube clamping means, and the welding operation is repeated as desired along the tube length. The tubes being clamped and welded are usually about 40–60 feet long.

This invention also includes a method for utilizing the panelizing machine for producing elongated panels consisting of a plurality of adjacent welded structures such as tubes. The method includes the steps of placing a plurality of elongated structures in parallel alignment on an elongated clamping frame which has at least two spaced-apart bed plate support members, and clamping the elongated structures onto the frame bed plate members at least two longitudinally separated locations by a vertically movable upper clamping member descending downwardly onto the structures, the clamping member being mounted in a carriage longitudinally movable on the frame. The clamped structures are then welded together at spaced intervals over at least a portion of their length by a welding unit mounted on one of the carriages. After such welding operation, the structures are unclamped and each carriage is moved to a new location on the clamping frame, then the elongated structures are reclamped and again welded at spaced intervals along the length of the structure to produce a welded panel structure.

The elongated structures being welded are preferably 4–16 tubes each 40–60 feet long and having each of the fins attached on opposite sides of each tube, so that the adjoining fins are stitch welded together at spaced intervals by electric arc welding procedures.

Although this panelizing machine has been generally described in terms of welding together elongated tubes, it can also be similarly used for welding together other elongated structurelizing machine and method is advantageously used for producing tubular panel units including 12–16 parallel tubes. The tubes each have longitudinal fins which are welded to the fins of adjacent tubes to provide a tubular panel having the desired width and 40–60 feet long, ready for complete seal welding the fins together to make a monolithic boiler furnace panel for a steam boiler.

BRIEF DESCRIPTION OF DRAWINGS

This invention will be further described by reference to the following drawings, in which.

DETAILED DESCRIPTION OF INVENTION

Figure 1:
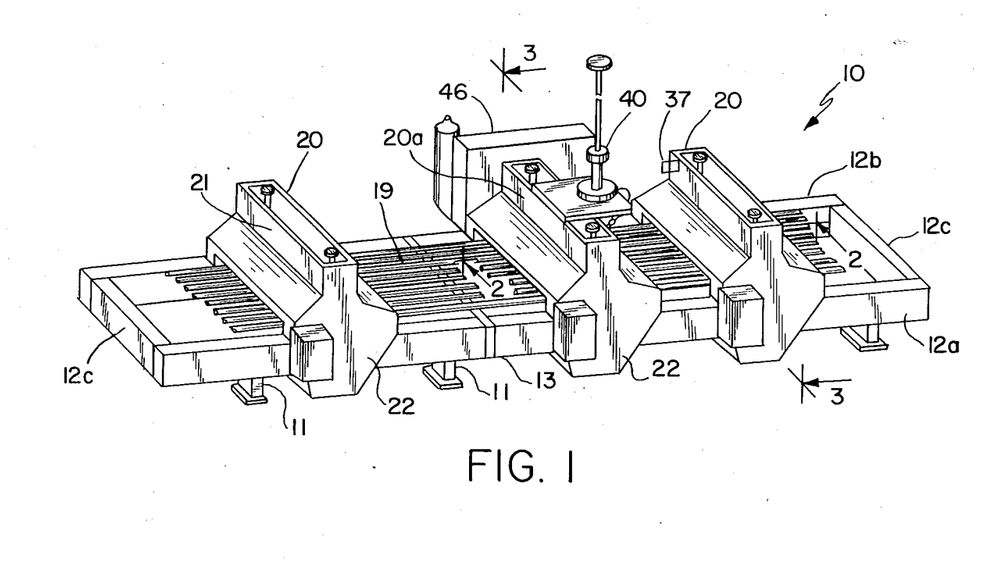
FIG. 1 shows a perspective view of the panelizing machine according to the present invention.

As is generally shown by FIG. 1, a panelizing machine assembly 10 for producing panelized tube structures is provided, which machine includes an elongated main support frame 12 consisting of two elongated parallel frame members 12a and 12b connected together by multiple spaced-apart cross members 12c, and which are all suitably supported such as by legs 11. For panelizing machine lengths exceeding about 30 feet, the frame 12 can be made up of two or more frame sections joined together at their adjacent ends by bolted joint 13.

Figure 2:
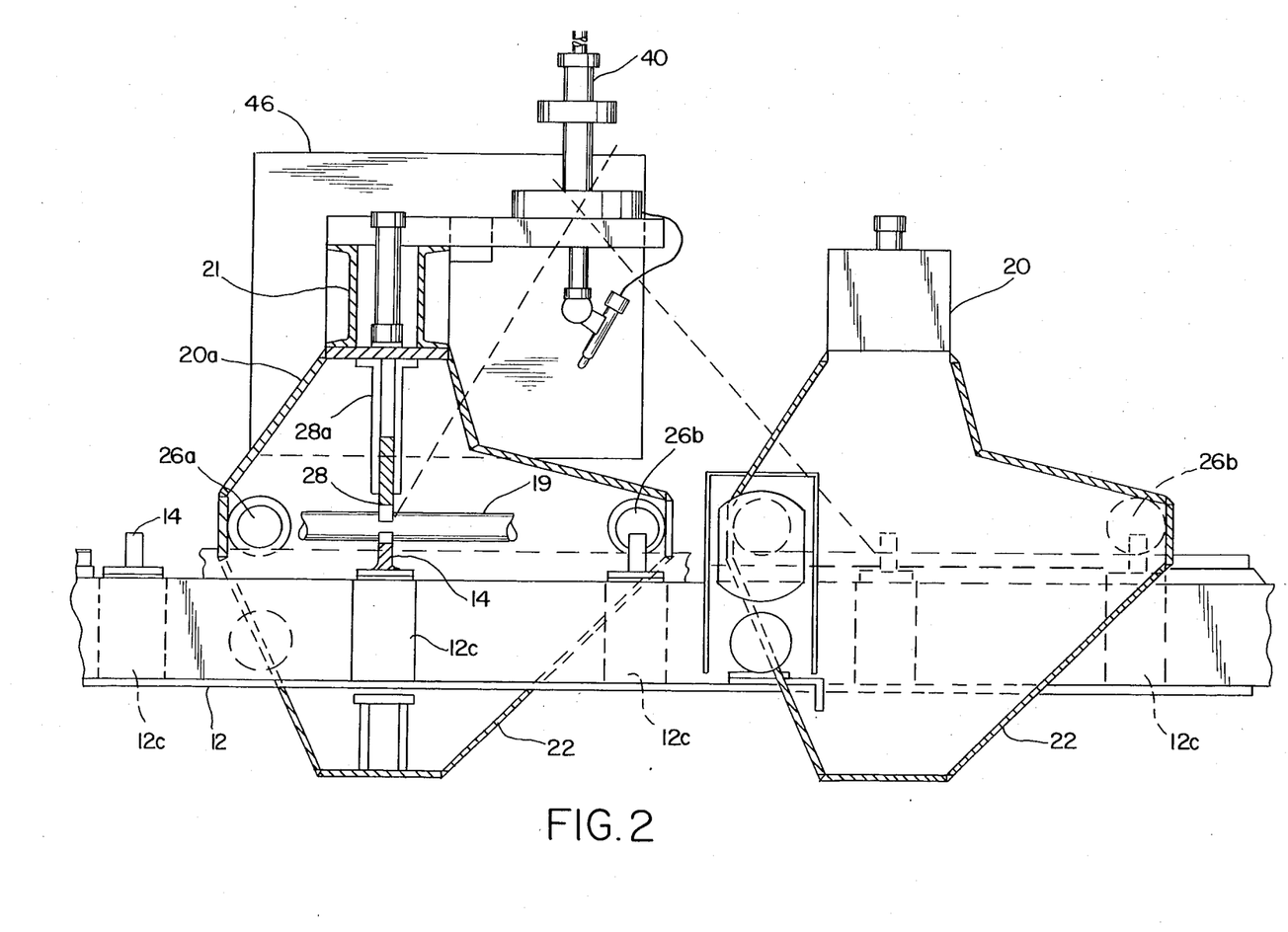
FIG. 2 is a longitudinal sectional elevation view taken at line 2—2′ of FIG. 1 and showing two longitudinally movable carriages with a welding device mounted on one of the carriages.
Figure 3:
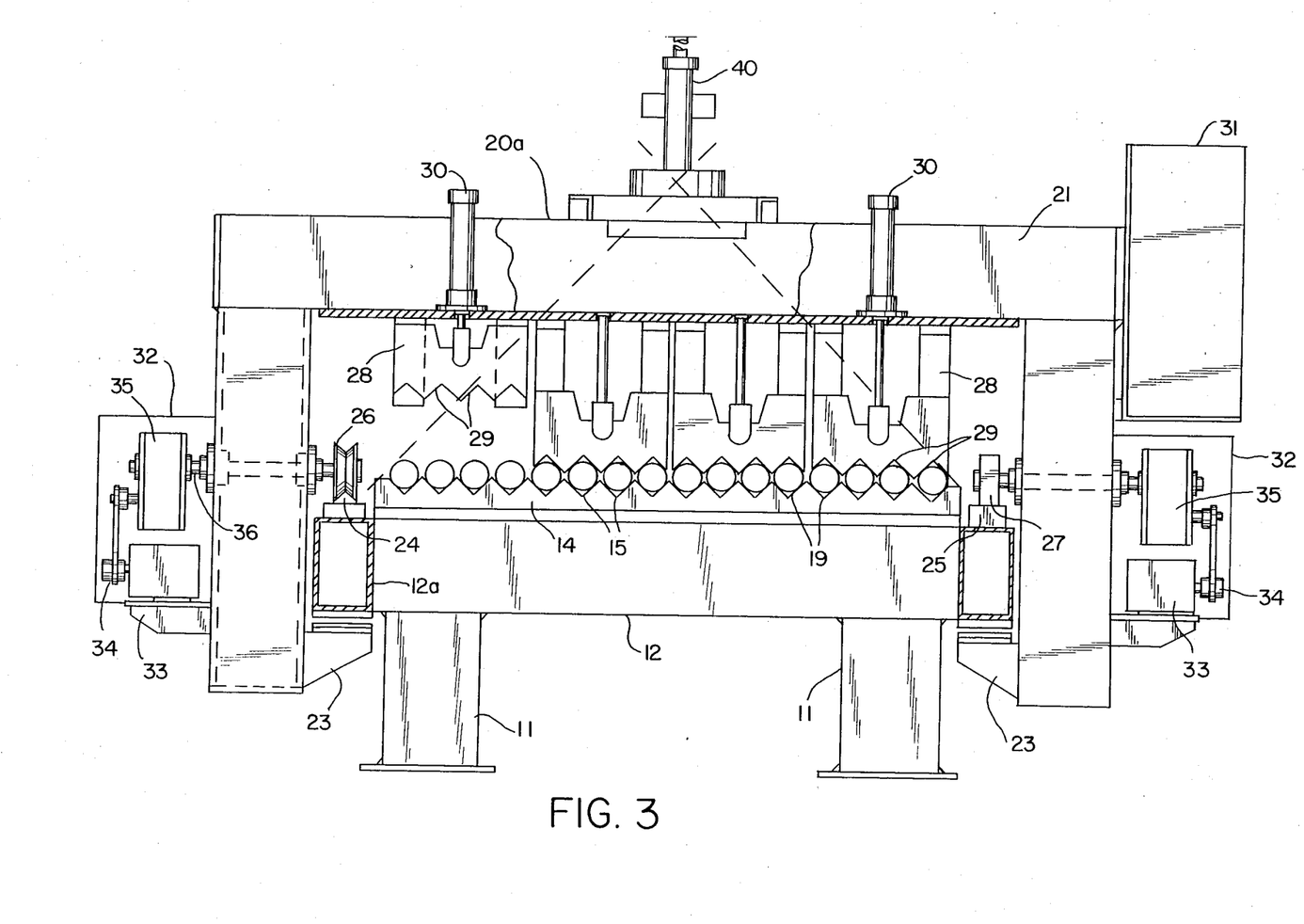
FIG. 3 is a transverse cross-sectional elevation view showing a movable carriage taken at line 3—3' of FIG. 1 and having a welding robot device and associated control equipment for mounting on a movable carriage and used for stitch welding together elongated structures in accordance with the invention.

As shown more clearly by FIGS. 2 and 3, the main frame 12 is provided with at least two profiled bed plates 14, which are each supported by a cross-member 12c and extend transversely across the frame structure 12, and are longitudinal spaced apart from each other along the frame. The bed plates 14 each have multiple V-shaped notches 15 located on the plates upper side, which are each adapted for receiving a plurality of elongated structures 19 such as tubes, on which welding operations are to be performed.

Mounted on the elongated frame 12 above the bed plates 14 are at least two clamping carriages 20, which each extend transversely across the frame 12 and are self-supporting thereon. The carriages 20 are spaced apart from each other and are longitudinally movable on the frame 12 by suitable drive means associated with each carriage. Each carriage 20 includes a bridge member 21 which is connected at each end to dual end plate members 22, and are each supported on the frame 12 by dual rollers which run on dual rails, each rail being attached lengthwise along the upper side of each elongated frame member 12a and 12b. Also, each end plate 22 is provided with a clamp means 23 which extends under the frame members 12a and 12b from each side so as to contact the lower side of the frame members and thereby resist the large clamping forces provided on the tubes 19 by a clamping piston, as is explained more fully below. Preferably three movable carriages 20 are provided mounted at spaced intervals on the frame 12.

Each movable carriage 20 is provided with at least two and preferably four profiled upper clamps 28, which each have multiple notches 29 provided on their lower edges and are each vertically guided by guide plates 28a. Each upper clamp 28 is vertically movable by a hydraulic piston 30 mounted in the cross members 21, for clamping the elongated structures or tubes 19 between the contoured bed plates 14 and the contoured upper clamp plate 28. During use, each carriage 20 is moved so that the profiled upper clamps 28 are located in vertical alignment with the lower bed plates 14, and upper clamps 28 are each actuated by the hydraulic piston 30 mounted in the carriage cross member 21. The vertically movable profile clamps 28 are capable of being raised sufficiently to permit installation and removal of the elongated tubes 19 which are to be welded.

Each hydraulic piston 30 which actuates each contoured plate 28 is provided with high pressure fluid from a supply unit 31, such as hydraulic fluid at 500–2000 psig pressure. These contoured or notched plates 28 descend and transversely clamp the the elongated tubes 19 in position on the mating contoured bed plates 14 by exerting a force of at least about 5000 lbs. and up to about 10,000 lbs on each set of four tubes, so as to hold the tubes rigid and straight while the welding operations are performed.

Each carriage 20 can be moved independently along the main frame 12 on rollers, which include guided V-shaped rollers 26 which engage in a V-shaped guide rail 24 attached longitudinally along one frame member 12a of the main frame. The other frame member 12b has provided on its upper side a flat rail 25 and mating flat wheels 27. Each carriage end plate 22 is provided with two rollers spaced apart at opposite ends of the plate 22. such as rollers 26a and 26b shown in FIG. 2 to provide stability for the movable carriage 20 on the rails 24 and 25.

Each carriage 20 can be moved longitudinally along the dual rails 24, 25 by an electric motor drive unit 32 provided at each end of the carriage, as is shown by FIG. 3. Each drive unit 32 includes an electric motor 33 directly connected to electric clutch 34, which in turn chain drives a gear reducer 35 and shaft 36, which is connected to either roller 26 or 27. For the panelizing machine assembly 10, at least two and preferably three movable carriages 20 are provided longitudinally spaced apart along the main frame 12, as determined by the welding requirements for the elongated tubes 19. A welding robot device 40 is mounted on the upper portion of the intermediate carriage 20a, the robot being arranged to provide both vertical and pivotal movements so as to weld all portions of the elongated structures.

The movements of each carriage 20 on the rails are electrically controlled, so that the three carriages can be moved either in unison or moved separately by use of infrared proximity sensors 37 which are mounted on each carriage 20 so as to monitor the distance between adjacent carriages. Electrically operated brakes are used on rollers 26, 27 to accurately position each carriage unit 20 along the base plate 12. Operation of the brakes is controlled by a control circuit 38 controlled by a switch 38a, thereby allowing each carriage unit 20 to be moved longitudinally to a new position along the rails 24, 25 of frame 12. By use of a selector switch in control panel 50, the carriages 20 can be positioned over the tubes 19 manually, ready to start an automatic welding cycle. After the carriages 20 are in the proper starting position and the switch is placed in the automatic mode position, the tube welding sequence will be initiated.

In the tube welding operations, the upper clamps 28 on the three carriages 20 will descend and clamp the parallel tubes 19 at three preset spaced-apart positions. The welding robot 40 mounted on an upper portion of the intermediate carriage 20a and which has been previously programmed, will move and automatically weld 4 rows of 1 inch long welds spaced 12 inches apart for adjoining tubes. Then the carriages 20 will automatically unclamp the tubes and the carriages will each move along the frame 12 to the next position along the tubes 19, then reclamp the tubes in the new position and repeat the welding cycle until the tubes are completely tack welded, such as with 1 inch long welds spaced at 12 inch intervals along the tube entire length and thereby provide a monolithic or monowall unit.

The panelizing machine welding operations are provided with means for manual override when desired. Thus, if a door opening needed in a tubular panel requires some tube bends which fall within the automatic cycle, then the particular clamps 28 can be activated by selector switch, e.g., 1, 2, 3 or all 4 tube clamps 28 can be used or inactivated as required.

Figure 4:
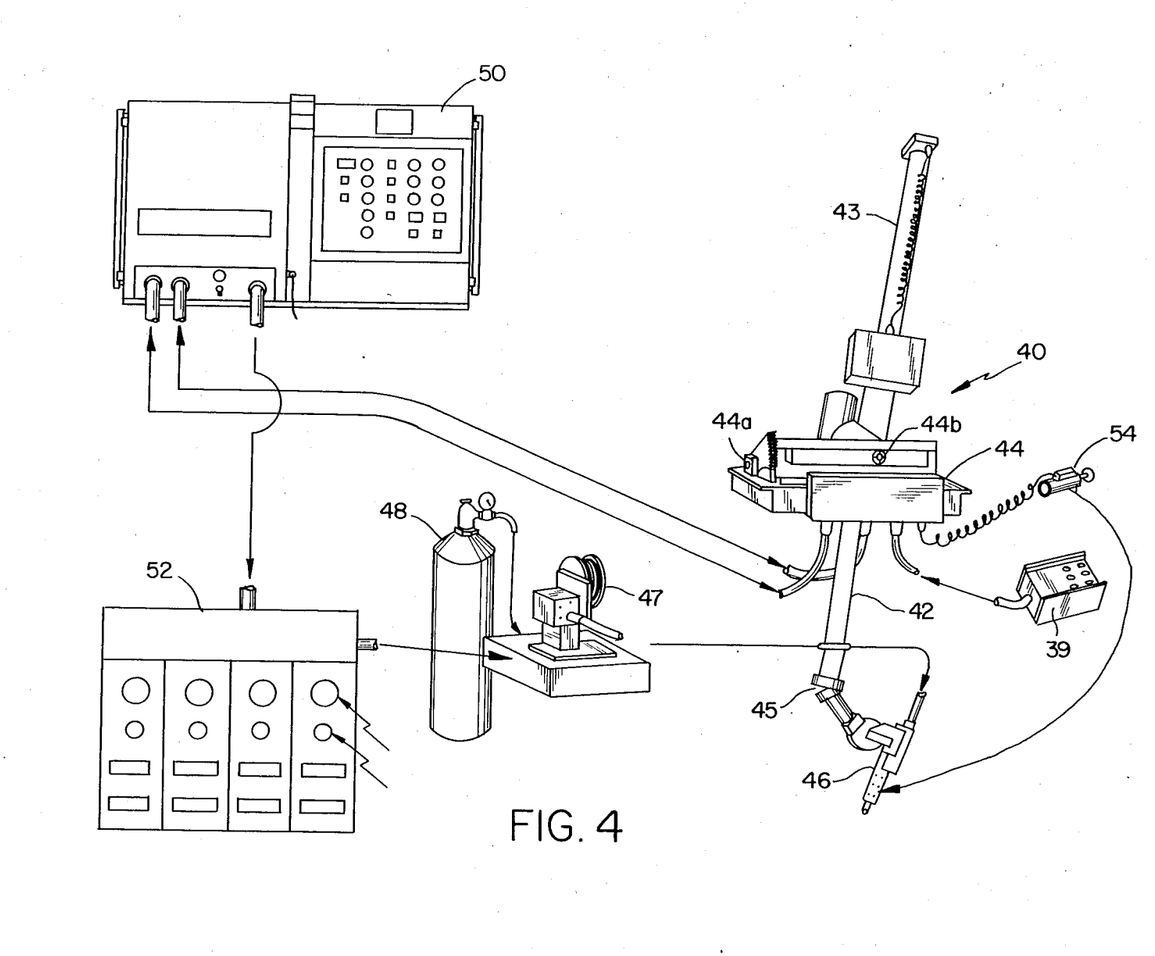
FIG. 4 is a schematic view showing the welding robot device and its associated control equipment.

The welding robot 40 and its associated control equipment is shown schematically by FIG. 4. Welding robot 40 includes an arm assembly 42 supported by a gimbal assembly 44, which is centrally mounted onto the upper portion of the central movable carriage 20a, as is seen in FIG. 2. Robot extension arm 43 is pivotable at axis 44a in a longitudinal direction relative to the elongated structures or tubes 19, and arm 43 is pivotable in a lateral direction at axis 44b.

Movements of the welding robot 40 during welding operations on tubes 19 are controlled by a control panel and power supply unit 50, which is mounted on one end of the central carriage 20a. The welding robot 40 can for example be an UNIMATE APPRENTICE or similar device, and is coupled to a welding system which may for example be a MILLER M.I.G., or similar welding system. The welding robot 40 is fitted with a welding torch unit 46 which is preferably a TWEECO TAM 400 unit, although other similar torch units can be used. The welding wire is fed to torch unit 46 by wire feeder means 47. Whenever an inert gas metal arc welding device and methods are used, a tank 48 containing a pressurized inert shielding gas such as argon or helium is also mounted at one end of the intermediate carriage 20a.

Operation of the welding torch assembly 46 including the parameters of electric voltage, amperage, metal wire feed rate and inert gas flow to the torch unit is controlled by console control unit 50, which is also interconnected with the welder control panel 52 and the torch unit 46. For automatic operation of the welding torch assembly 46, the operating parameters are first pre-programmed by a teach control unit 54. Manual control of the robot welder 40 can be effected by a control unit 56 which is also connected to the gimbal assembly 44.

Figure 5:
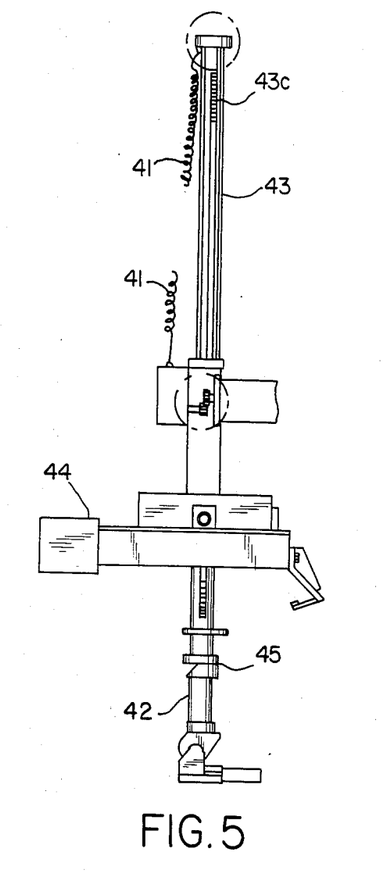
FIGS. 5, 5A and 5B show important details of the robot welding device.
Figure 5A:
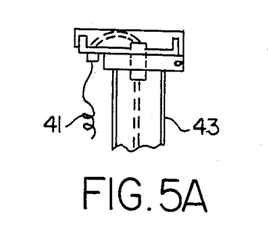
Figure 5B:
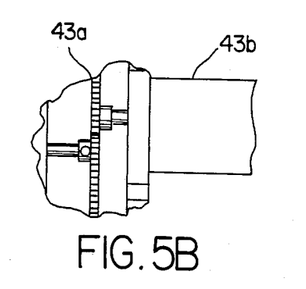

The torch arm assembly 42 and gimbal assembly 44 of welding robot 40 are additionally shown in FIG. 5. Torch arm 43 is moved vertically relative to gimbal assembly 44 by gear 43a driven by motor 43b mounted on the gimbal assembly, and engaging rack 43c mounted on the arm 43, as shown in enlarged detail by FIG. 5B. Electric power is supplied through flexible cable 41 to the arm 43 upper end and thence through an inner conductor (not shown) to the welding torch unit 46.

The torch assembly 42 is able to be rotated about the central axis of arm 43, and is also hinged at joint 45. The robot assembly 40 is adapted for moving the arm assembly 42 and torch unit 46 vertically, as well as to pivot it in both longitudinal and transverse directions relative to the elongated tubes 19 being welded so as to traverse all surfaces of the tubes, as is generally shown by FIGS. 6 and 7.

Figure 6:
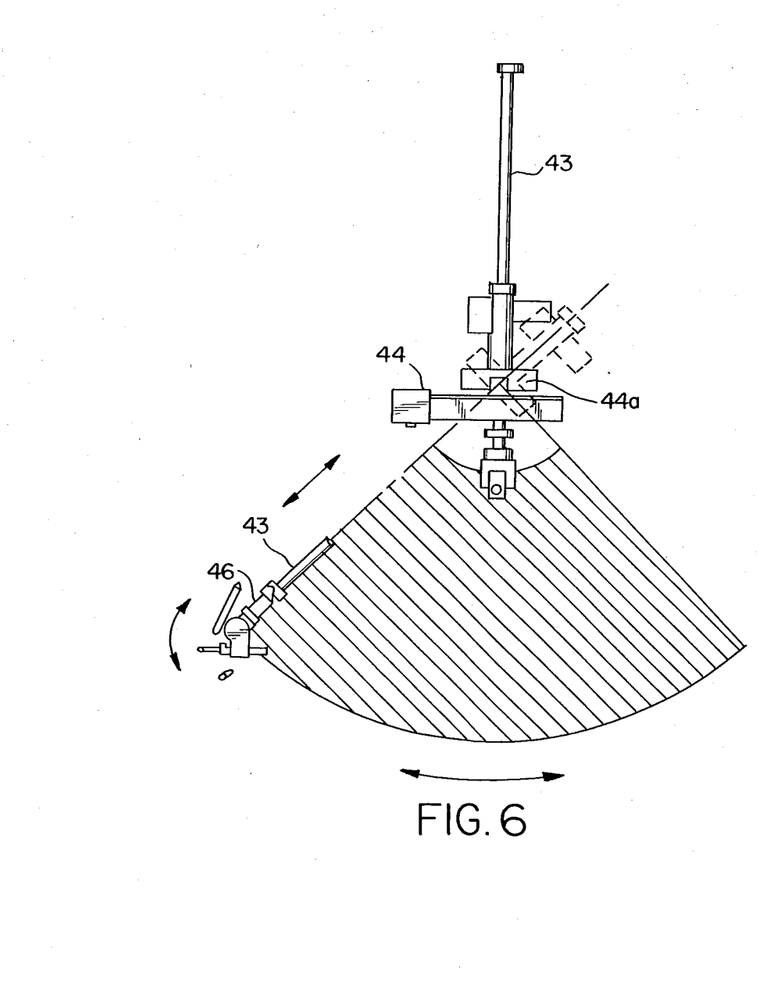
FIG. 6 is a side elevation view of the welding device showing its range of longitudinal and vertical movements.
Figure 7:
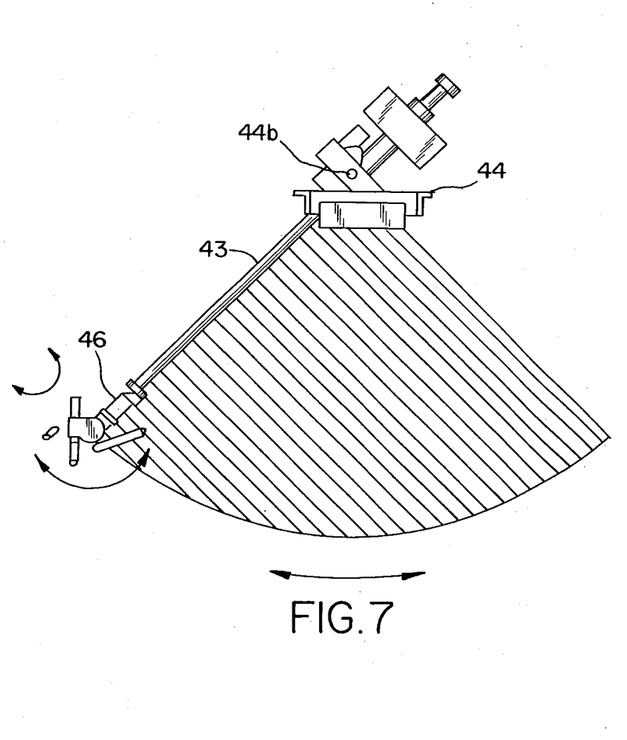
FIG. 7 is a front elevation view of the welding device showing its range of lateral movement.

FIG. 6 shows arm 43 in both an extended and a withdrawn position relative to gimbal assembly 44, and arm 43 can also be rotated about pivot 44a to move through a longitudinal angle of about 90° relative to the length of the elongated tubes 19. Also, welding torch unit 46 can be pivoted at joint 45 as required to perform the welding operations. FIG. 7 shows the torch arm 43 in an extended position and pivoated at 44b through a lateral angle of about 90° relative to the elongated tubes 19 to perform a welding operation on all the tubes.

This invention will be further described by use of the following specific example, which should not be construed as limiting in scope of the invention.

EXAMPLE

A panelizing machine for welding adjacent tubes is provided which has an elongated main frame 6.5 ft. wide by 70 ft. long, and three movable transverse clamping carriages supported by rollers on dual rails on the frame. The frame and carriages are each sized to receive 16 tubes, each tube being 3 inch diameter by 60 feet long and having a longitudinal fin 0.25 inch thick by 0.50 inch wide extending along two opposite sides of each tube, thereby making a tubular structure 4 inch wide for each tube and a total width 64 in. across the 16 tubes. The tubes are loaded into V-shaped notches provided in frame bed plates each spaced 2 ft. apart along the frame, and the tubes are clamped against the bed plates by four vertically movable contoured upper clamps provided in each carriage, and are pressure clamped rigidly into place. Then the panelizing machine welding device is activated, and the adjoining fins of the tubes are electric arc tack welded to spaced at 12 in. gether by making multiple welds about 1 in. long intervals along a four foot length of the tubes by a welding robot mounted on the central carriage. The tubes are then unclamped and the carriages moved forward by a distance of 4 ft. and the operation repeated for the entire 60 ft. length of the tubes. The resulting stitch welded tube panel is then removed from the panelizing machine, and after further seam welding can form a partial wall for a steam generating boiler.

Although this invention has been described broadly and in terms of a preferred embodiment, it will be apparent that desirable modifications and variations can be made to the panelizing machine and its operation all within the scope of the invention, which is defined by the following claims.

I claim:

1. A panelizing machine for clamping and welding a plurality of elongated structures, the machine comprising:
   (a) an elongated main frame including dual elongated parallel frame members and at least two connecting cross members, each frame member being provided with a rail extending along an upper side of the frame member;
   (b) at least two bed plates extending transversely across said main frame and spaced apart from each other, each said bed plate being supported by one of said cross members and each having a plurality of notches provided on the plate upper side, and adapted for receiving a plurality of elongated structures in the notches;
   (c) at least two carriages extending transversely across said main frame, said carriage being supported by said rails and being longitudinally movable along the main frame on the rails;
   (d) at least one vertically movable contoured clamping plate provided within each said carriage, each said clamping plate being attached on its upper side to a pressurizable piston means, and having a plurality of notches provided on the plate lower side in vertical alignment with the notches provided on the upper side of each said bed plate, and adapted for clamping and retaining a plurality of the elongated structures onto the main frame; and (e) a welding device mounted on the upper portion of one said carriage, said welding device being adapted to be positioned for performing a welding operation on the clamped elongated structures.

2. A panelizing machine according to claim 1, wherein each carriage includes an end plate located at each end, each end plate having an extension portion which contacts a lower side of the main frame when clamping the structural elements.

3. A panelizing machine according to claim 1, wherein each said carriage is supported and longitudinally movable along said rails by dual rollers provided at each end of the carriage for running on each rail provided on each said frame member.

4. A panelizing machine according to claim 1, wherein each said contoured clamping plate is vertically movable by a pressurizable piston means attached to the upper edge of the clamping plate.

5. A panelizing machine according to claim 1, wherein three carriages are provided on said main frame, the central carriage having the welding robot unit attached to an upper portion of the carriage and adapted for making welds on the elongated structures, with the two other carriages being used for accurately clamping the elongated structures to the bed plates during the welding on the elongated structures.

6. A panelizing machine according to claim 3, wherein the rollers at one end of said carriage are V-shaped and run along a V-shaped rail provided on one said main member, the rollers on the carriage other end being flat rollers running on a flat rail attached to the other frame member.

7. The panelizing machine according to claim 2, wherein each carriage has an electric motor and drive gear unit attached to each end plate for moving the carriage along the rails.

8. A panelizing machine according to claim 7, wherein each said carriage is provided with braking means for accurately positioning the carriage along the main frame.

9. A panelizing machine according to claim 2, wherein each said carriage is spaced apart from each other by proximity sensors provided on the carriage.

10. A panelizing machine for clamping and welding a plurality of elongated structures, the machine comprising:

(a) an elongated main frame including dual elongated parallel frame members and at least two connecting cross members, each frame member being provided with a rail extending along the upper side of the frame member;

(b) at least three bed plates extending transversely across said main frame and spaced apart from each other, each said bed plate being supported by one of said cross members and each bed plate having a plurality of notches provided on the plate upper side, and adapted for receiving a plurality of elongated tubular structures in the notches;

(c) three carriages extending transversely across and supported by said main frame, each said carriage having dual end plates which have extension portions adapted to extend below the frame members and being longitudinally movable along the main frame by rollers running on said rails; and (d) at least two vertically movable contoured clamping plates provided within each said carriage, each said clamping plate being attached on its upper side to a pressurizable hydraulic piston means, and having a plurality of notches provided on the plate lower side in vertical alignment with the notches provided on the upper side of each said bed plate, and adapted for clamping and retaining a plurality of elongated tubular structures onto the main frame; and (e) a robot welding device mounted on the upper portion of the central of said carriages, said welding device being adapted to be positioned for making a plurality of spaced apart welds on the clamped tubular structures.

11. A method for producing elongated welded panels including the steps of:

(a) placing a plurality of elongated structures in parallel alignment onto an elongated clamping frame having at least two spaced-apart bed plate support members;

(b) clamping the elongated structures to the bed plate support members at least two longitudinally spaced locations by a horizontally and vertically movable upper clamping plate descending onto the elongated structures at each said location, the clamping plates being mounted in a carriage longitudinally movable on the clamping frame;

(c) welding the adjacent elongated structures together at longitudinally spaced intervals over at least a portion of their length by utilizing a welding device mounted on one of the carriages; and (d) unclamping the elongated structures and moving the welding carriage to a new location on the clamping frame, then reclamping the elongated structures and again welding them together at longitudinal spaced intervals along their length, so as to produce an elongated welded panel structure.

12. The method of claim 11, wherein the elongated structures are clamped onto the clamping frames at three locations by three said carriages including an intermediate carriage and a trailing carriage, and the structures are welded by the robot welding device mounted on the intermediate carriage.

13. The method of claim 12, wherein the clamping carriages are longitudinally spaced apart from each other by 2-10 feet, and the intermediate carriage is moved forward after the trailing carriage is moved forward.

14. The method of claim 11, wherein the elongated parallel structures are clamped at intervals of 3-5 feet using a force of 2000-10,000 lbs. applied on a set of four adjacent said structures.

15. The method of claim 11, wherein the elongated parallel structures are tubes which each have oppositely oriented fins, and the adjacent fins are stitch welded together at spaced intervals.

16. The method of claim 11, wherein the intermittent welding is performed using inert gas metal arc welding procedures.

17. A method for producing elongated welded panels, including the steps of:

(a) placing a plurality of elongated structures in parallel alignment onto an elongated clamping frame having at least three spaced-apart bed palte support members;

(b) clamping the elongated structures to the bed plate support members at three longitudinally spaced-apart locations by a horizontally and vertically movable upper clamping plate descending onto the elongated structures at each said location, the clamping plates being mounted in a carriage longitudinally movable on the clamping frame;

(c) welding the adjacent elongated structures together at longitudinally spaced intervals over at least a portion of their length by utilizing a welding device mounted on the intermediate of said carriages; and (d) unclamping the elongated structures and moving the welding carriage forward by 2-10 feet to another location on the clamping frame, then reclamping the elongated structures and again welding them together at spaced intervals along their length, so as to produce an elongated welded panel structure.

* * * * *